Figure 1A:
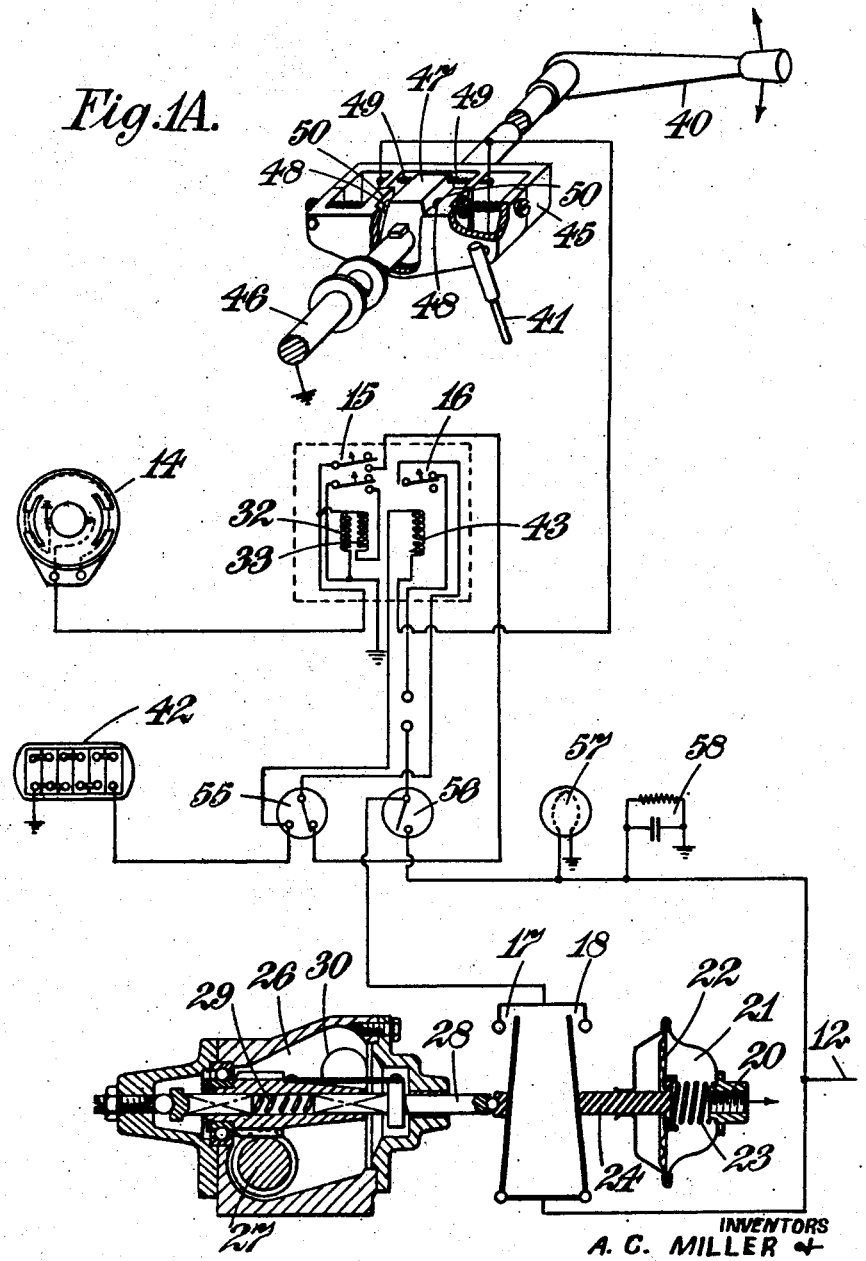

July 28, 1953  A. C. MILLER ET AL  2,646,864
MOTOR VEHICLE POWER TRANSMISSION SYSTEM
Filed Aug. 21, 1951  2 Sheets-Sheet 1

INVENTORS
A. C. MILLER &
A. M. KAMPER &
G. BERRY
By Wilkinson & Mawhinney
ATTYS.

July 28, 1953 A. C. MILLER ET AL 2,646,864
MOTOR VEHICLE POWER TRANSMISSION SYSTEM
Filed Aug. 21, 1951 2 Sheets-Sheet 2

INVENTORS
A. C. MILLER +
A. M. KAMPER +
G. BERRY
By Wilkinson + Mawhinney
ATTYS.

Patented July 28, 1953

2,646,864

UNITED STATES PATENT OFFICE 2,646,864

MOTOR VEHICLE POWER TRANSMISSION SYSTEM

Andrew Craig Miller, Andrew Mathis Kamper, and Geoffrey Berry, Coventry, England, assignors to Humber Limited, Stoke, Coventry, England, a British company Application August 21, 1951, Serial No. 242,946
In Great Britain February 7, 1951

8 Claims. (Cl. 192—3.5)

1

The invention relates to motor vehicles and more particularly to the power transmission systems of such vehicles. The invention is concerned with vehicles having power transmission systems of the kind embodying a kinetic hydraulic torque converter in the drive from the engine to the road wheels, the torque converter comprising a driving member and a driven member which rotate relatively during torque conversion, and a reaction member held against rotation in at least one direction. One example of such a torque converter is that known as the Salerni converter.

Hydraulic torque converters have many practical advantages for use in motor vehicle transmission systems but they also have the disadvantage that under conditions when torque conversion is not required (e. g. when travelling at high speed on level roads) a certain amount of slip with loss of mechanical efficiency occurs. This disadvantage may be avoided or largely reduced by providing a clutch, conveniently a magnetic clutch of the friction or eddy current types, by which the driving and driven members may be coupled together for rotation in unison when torque conversion is not required and it is an object of the present invention to provide means whereby such a magnetic clutch may be caused to engage and disengage automatically under appropriate conditions.

The invention consists in a motor vehicle having a power transmission system of the kind embodying a kinetic hydraulic torque converter in the drive between the engine and the road wheels, the torque converter comprising a driving member and a driven member arranged for relative rotation during torque conversion and also a reaction member and having an electromagnetic clutch by which the driving and driven members may be clutched together for rotation in unison characterised by control means for the clutch operable by the degree of suction in the suction inlet of the engine to release the clutch when the suction falls to a predetermined value.

In one form of the invention the control means comprise a switch in the clutch circuit and a capsule or diaphragm and chamber or piston and cylinder connected to the engine inlet manifold and arranged to open the switch when the suction falls to the value aforesaid.

Preferably the vehicle according to the invention is further characterised by means responsive to the speed of the engine or to the road speed to engage the clutch when the engine or road speed reaches a predetermined maximum above which torque conversion is no longer required. This clutch engaging means may comprise an electric switch in the clutch circuit and a centrifugal operating device therefor driven in synchronism with the engine or with the road wheels.

A vehicle embodying the preferred construction just described will operate with the clutch engaged and the driving and driven members of the torque converter held for unison rotation at all speeds so long as the power required is low and the suction in the inlet to the engine correspondingly high. If the power required is increased, for example, to accelerate the vehicle or to climb a hill the usual throttle will be opened and the suction in the inlet will decrease. If this occurs at an engine or road speed below the above-mentioned predetermined maximum speed the suction-controlled switch will then open and the clutch be disengaged to permit torque conversion. If, however, the vehicle is travelling above the aforesaid predetermined maximum speed the speed responsive control switch will be closed and the clutch will not disengage.

It is also preferred that there are included in the vehicle means responsive to the engine speed for maintaining the clutch disengaged until the engine has reached a speed at which torque conversion is not required under light load. For example the clutch may be arranged for energisation by an engine driven generator and the means for holding the clutch disengaged may comprise a relay switch in the clutch circuit normally open but closed by the generator output when it reaches the value determined by the engine speed aforesaid. Engine speed control of the clutch in this way ensures that the clutch will not be engaged when the engine is running at idling speeds.

A further preferred feature of the invention is that means are included for disengaging the clutch when the engine speed falls below a predetermined value less than that described above. These means may comprise a holding coil for the relay which coil is energised by the generator output and is arranged to hold the relay closed until the engine speed falls below the said value. The primary object of this feature of the invention is to ensure that the engine will be available to serve as a brake until a comparatively low speed has been reached.

Other features which may be embodied in the invention are means for changing from a generator to a battery for energisation of the clutch, an over-riding switch for cutting out the suction operated and centrifugally operated switches and a change-speed gear and switch for automatically disengaging the clutch during the operation of changing gears.

Figure 1B:
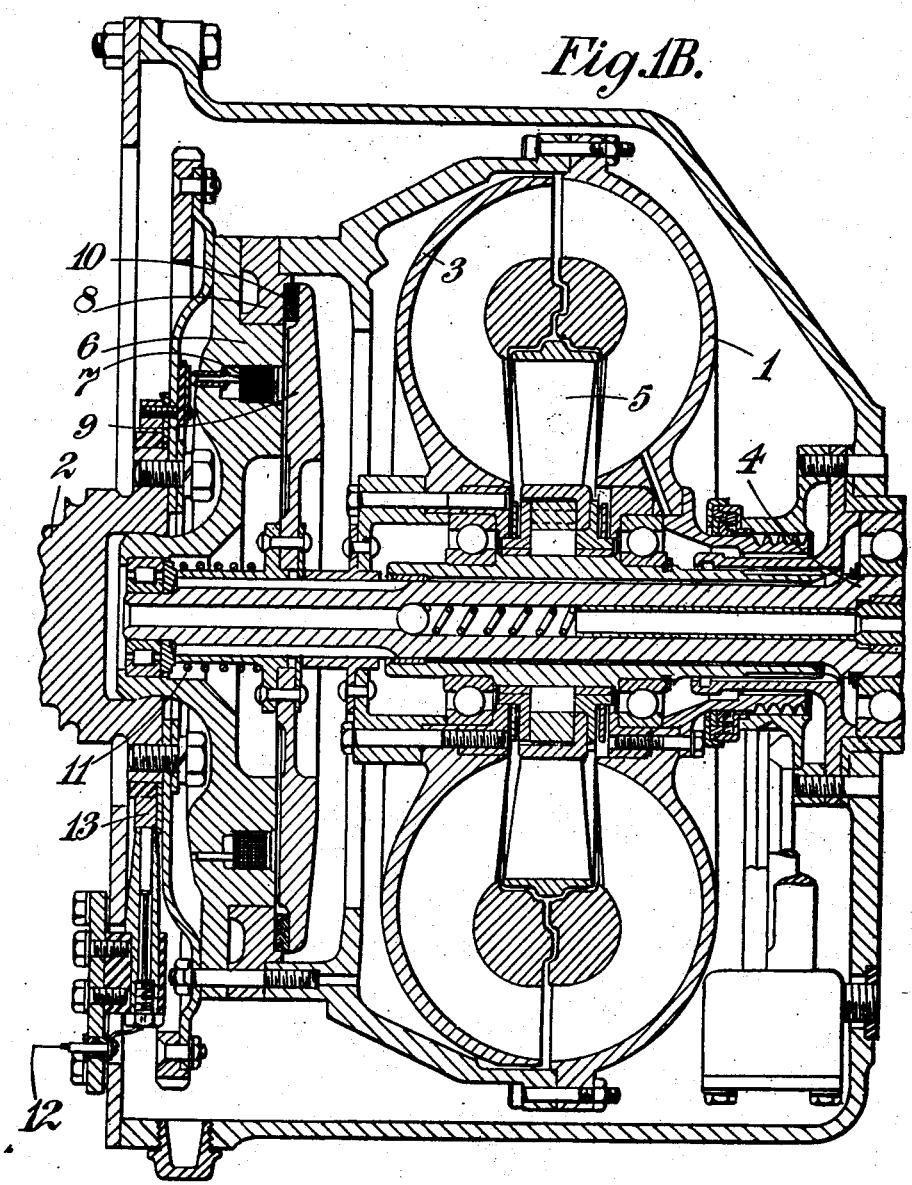

All of the above features are embodied in a specific example of the invention which will now be described with reference to the accompanying single drawing. In order that the drawing may be of sufficient size to show the construction clearly it has been divided into two parts of which Figure 1A shows, diagrammatically, the several clutch controlling devices and Figure 1B shows a section through the torque converter and associated devices. The constructions shown in the two parts of the figure are connected by the electrical lead 12 later described.

The vehicle forming the subject of this example is basically a normal passenger-carrying motor car with the drive to the rear wheels. The transmission system from the engine to the rear wheels comprises a torque converter and, behind the converter, a two-speed, or more, and reverse gear box. The engine is provided with the usual electric generator and there is the usual storage battery.

The torque converter is illustrated in detail in the drawing and comprises a driving impeller 1 secured to a driving shaft 2 for rotation therewith, the driving shaft being coupled to the engine, a driven turbine 3 secured to a driven shaft 4 and a reaction member 5.

Secured to the driving member 1 there is a magnet 6 incorporating an annular energising coil 7. The magnet is associated with a friction clutch member 8 which rotates with the magnet. Co-operating with the magnet there is an armature 9 in the form of a disc splined to the driven shaft 4. The armature carries a ring 10 of friction material co-operating with the clutch member 8. A spring 11 urges the armature in the rearwards direction to disengage the clutch. The arrangement is that energisation of the coil 7 attracts the armature to the magnet and engages the friction surfaces to clutch the driven turbine 3 to rotate in unison with the driving member 1 whereas when the coil is deenergised relative rotation between the members 1 and 3 may take place with conversion of the torque.

Current to energise the coil is conveyed through a lead 12 which is connected to one end of the coil through a slip ring 13, the other end of the coil being earthed.

Normally current is supplied to the clutch coil from the engine driven generator 14 through a circuit comprising a relay switch 15 and two switches 17 and 18 connected in parallel.

The switch 18 is operable by the degree of suction in the engine inlet manifold. A suction connection is taken from the inlet manifold of the engine to the inlet 20 to a chamber 21 of which one wall is constituted by a flexible diaphragm 22. A spring 23 urges the diaphragm outwardly against the suction. A push-rod 24 attached to the diaphragm serves to operate the switch 18 and to open the switch when the suction in the chamber 21 falls below a predetermined value and to allow the switch to close when the suction increases above the value. It will be appreciated that the degree of suction in the inlet manifold is a measure of the power output of the engine and the value of the suction at which the switch 18 opens is chosen to correspond with the power output at which torque conversion is desired to begin.

The switch 17 is arranged for operation by a centrifugal device 26. In this example the device is driven by worm or skew gearing from the engine crankshaft 27 but it may be driven by a belt, chain or other means, if desired. The device includes a spindle 28 arranged for axial movement against a spring 29 by outward movement of the centrifugal weights 30. The spindle 28 is connected to the switch 17 and is arranged to close the switch and thereby to energise the clutch coil when the engine speed reaches a predetermined value. The value of the engine speed at which the switch 17 is closed is chosen to correspond to a high road speed at which torque conversion ceases to be desirable.

The relay switch 15 has two coils 32, 33. The coil 32 is connected from the generator 14 to earth and is arranged to close the switch contacts when the generator output, which increases with increase of engine speed over the lower range of the engine speed, reaches the value corresponding to the minimum engine speed at which torque conversion is not required. In the case of a 12 volt system the coil may be arranged to close the contacts when the generator voltage reaches 14 volts. Consequently the relay switch ensures that the clutch is not engaged to lock the torque converter when the engine is idling. The second coil 33 is a holding coil and is arranged to maintain the relay switch closed until the engine speed has fallen to a low value less than that at which the coil 32 operates to close the switch. The coil 33 accordingly ensures that the clutch will not disengage when the engine is being used as a brake until a low speed has been reached. In the case of a 12 volt system the coil may hold the contacts closed until the generator output drops to about 5 volts.

The two-speed gear box is operable by means of a hand lever 40, the lever having a connection 41 to the gear selecting member of the box. The lever incorporates a switch which controls the energisation, from the battery 42, of the coil 43 of the relay switch 16. The arrangement is that movement of the lever 40 in either direction effects energisation of the coil 43 and opens the switch 16 thereby to ensure that the clutch is disengaged during gear changing. Release of the lever at the end of the gear-changing movement opens the switch and de-energises coil 43. The lever controlled switch comprises a housing 45 supported on the shaft 46 to which the lever is attached, and free for rotation on that shaft through a small angle. The connection 41 is attached to the housing. A lug 47 is secured to the shaft 46 and two spring plungers 48 mounted in the housing and engaging the lug 47 tend to centralise the housing on the shaft. Two spring contacts 49 are carried by the housing and so arranged that one or other of them will be engaged by the lug 47 when the housing is moved from its central position. In use when the lever is moved in either direction the lug 47 rotates relatively to the housing until it engages one of the stop surfaces 50 and in the course of this movement it makes contact with and earths one of the contacts 49. Continued movement of the lever 40 after engagement with the surface 50 effects rotation of the housing to make the gear change. When the lever is released at the end of the gear change the spring plungers centralise it with respect to the housing and connection with the contact 49 is broken.

The circuit includes an emergency switch 55 by which electric supply for the clutch may be obtained from the battery 42 instead of the generator 14. This switch cuts out the relay switch 15.

There is also a switch 56 by which the automatic switches 17 and 18 may be cut out.

An indicator lamp 57 is included to show when the clutch is energised and interference suppressing means 58 may also be provided.

We claim:

1. A motor vehicle having an internal combustion engine with a suction inlet and a control valve therein, road wheels and a driving connection between the engine and road wheels which connection includes a kinetic hydraulic torque converter comprising a driving impeller, a driven turbine and a reaction member and an electromagnetic clutch by which the impeller and turbine may be clutched together for rotation in unison, and an electric circuit including the clutch magnet and a source of electricity by which the clutch magnet may be energised, which motor vehicle is characterised by switch means in the aforesaid circuit controlling energisation of the clutch magnet, a suction-responsive device with a connection to the suction inlet and an operative connection between the suction-responsive device and the switch means whereby the switch means is operated to release the clutch when the device responds to a fall in the suction in the inlet to a predetermined value.

2. A motor vehicle as claimed in claim 1 and further characterised by an engine-driven centrifugal speed-responsive device, a second switch means in parallel relation with the switch means aforesaid, and an operative connection between the speed-responsive device and the second switch means whereby the second switch means is operated to effect engagement of the clutch when the device responds to a predetermined maximum engine speed at which torque conversion is required.

3. A motor vehicle as claimed in claim 1 and further characterised by a centrifugal speed-responsive device and means for driving the device in synchronism with the road wheels, a second switch means in parallel relation with the switch means aforesaid and an operative connection between the speed-responsive device and the second switch means whereby the second switch means is operated to engage the clutch when the road speed reaches a predetermined maximum for torque conversion.

4. A motor vehicle as claimed in claim 1 and including an engine driven electrical generator of which the output increases with increase in engine speed, a relay switch having an operating coil in a circuit energised by the generator and contacts in the aforesaid clutch engaging circuit operated by the coil and arranged for maintaining the clutch disengaged until the generator has reached a speed at which its output is sufficient to operate the relay.

5. A motor vehicle as claimed in claim 4 in which the relay switch also has a holding coil connected for energisation by the generator output and arranged to hold the relay contacts in the position of engaging the clutch until the generator output has fallen to a value less than that at which the relay operates to effect engagement of the clutch.

6. A motor vehicle as claimed in claim 1 and having a centrifugal speed-responsive device, switch means operable by the device to engage the clutch when the device responds to a predetermined speed and a manually operable further switch connected in the circuit for over-riding the suction-operated and speed-operated switches.

7. A motor vehicle as claimed in claim 1 and including a change-speed gear in the driving connection, a manually operable gear-changing member and a switch coupled to the gear-changing member for operation thereby during changing of the gear, the switch being connected in a clutch controlling circuit to effect disengagement of the clutch during the operation of changing gear.

8. An internal combustion engine motor vehicle having a power transmission system embodying a kinetic hydraulic torque converter in a drive between the engine and road wheels of the vehicle, the torque converter comprising a driving member and a driven member arranged for relative rotation during torque conversion, having an electromagnetic clutch by which the driving and driven members of the torque converter may be clutched together for rotation in unison, having an engine driven generator of which the output varies with engine speed, and which is connected in an operating circuit with the clutch magnet to effect energisation of the clutch and having control means for the clutch comprising switch means in the aforesaid clutch magnet circuit for controlling the energisation of the clutch, a suction operated diaphragm and chamber connected to the engine inlet and having an operative connection to the switch means to operate the latter to release the clutch when the suction in the inlet falls to a predetermined value, a centrifugal speed-responsive device for operating the switch means and driven from the engine, the device being arranged to operate the switch means to engage the clutch when a predetermined engine speed is reached above which torque conversion is not required, a relay switch having contacts in the clutch circuit and having an operating coil with connections to the generator for energisation thereby, the relay switch contacts being connected to maintain the clutch disengaged until the generator output reaches a predetermined value at which the relay operates to effect engagement of the clutch and which corresponds to an engine speed above which torque conversion is not required under light load, and the relay switch also having a holding coil with connections to the generator for energisation thereby and arranged to hold the relay switch contacts in the clutch-engaging position, after engagement of the clutch, until the generator output falls below that at which the relay operates to engage the clutch.

ANDREW CRAIG MILLER.
ANDREW MATHIS KAMPER.
GEOFFREY BERRY.

References Cited in the file of this patent

UNITED STATES PATENTS

| Number | Name | Date |
|---|---|---|
| Re. 22,967 | Nutt et al. | Jan. 27, 1948 |
| 2,226,802 | Black | Dec. 31, 1940 |
| 2,277,214 | Dodge | Mar. 24, 1942 |
| 2,322,479 | Schjolin | June 22, 1943 |
| 2,351,483 | Carnagua | June 13, 1944 |
| 2,397,634 | Voytech | Apr. 2, 1946 |
| 2,402,164 | Kelbel | June 18, 1946 |
| 2,404,657 | Roberts et al. | July 23, 1946 |
| 2,548,032 | Lapsley | Jan. 29, 1952 |